US012200394B2

(12) United States Patent
Zhu et al.

(10) Patent No.: US 12,200,394 B2
(45) Date of Patent: Jan. 14, 2025

(54) SMART VIDEO CONFERENCE ENVIRONMENT

(71) Applicant: Capital One Services, LLC, McLean, VA (US)

(72) Inventors: Xiaoguang Zhu, New York, NY (US); Ray Cheng, Long Island City, NY (US); Phoebe Atkins, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 164 days.

(21) Appl. No.: 17/846,073

(22) Filed: Jun. 22, 2022

(65) Prior Publication Data

US 2023/0421719 A1 Dec. 28, 2023

(51) Int. Cl.
| | |
|---|---|
| *H04N 5/272* | (2006.01) |
| *G06F 40/279* | (2020.01) |
| *G06F 40/30* | (2020.01) |
| *G06Q 30/04* | (2012.01) |
| *G06T 7/194* | (2017.01) |
| *G06T 11/00* | (2006.01) |
| *G10L 15/22* | (2006.01) |
| *G10L 15/26* | (2006.01) |
| *G10L 25/57* | (2013.01) |

(52) U.S. Cl.
CPC .......... *H04N 5/272* (2013.01); *G06F 40/279* (2020.01); *G06F 40/30* (2020.01); *G06Q 30/04* (2013.01); *G06T 7/194* (2017.01); *G06T 11/00* (2013.01); *G10L 15/22* (2013.01); *G10L 15/26* (2013.01); *G10L 25/57* (2013.01); *G06T 2207/10016* (2013.01)

(58) Field of Classification Search
CPC ......... H04N 5/272; G06T 7/194; G06T 11/00; G06T 2207/10016; G06F 40/279; G06F 40/30; G06Q 30/04; G10L 15/22; G10L 15/26; G10L 25/57
USPC ....................................................... 345/633
See application file for complete search history.

(56) References Cited

U.S. PATENT DOCUMENTS

| | | | |
|---|---|---|---|
| 7,506,027 B1 | 3/2009 | Heald et al. | |
| 9,436,774 B2 | 9/2016 | Stuart | |
| 11,847,582 B1 * | 12/2023 | Bowers | G06Q 20/3221 |
| 2003/0163547 A1 | 8/2003 | Beisty et al. | |
| 2004/0104933 A1 | 6/2004 | Friedrich et al. | |
| 2004/0135820 A1 | 7/2004 | Deaton et al. | |
| 2009/0138554 A1 | 5/2009 | Longobardi et al. | |

(Continued)

*Primary Examiner* — Jin Ge
(74) *Attorney, Agent, or Firm* — Foley & Lardner LLP

(57) ABSTRACT

Disclosed embodiments relate to a smart video conference environment. A live video of a conference participant can be segmented into a foreground, including the participant, and a background that excludes the participant. The background can be replaced by a virtual background determined based on one or more factors. The factors can include context data acquired from a calendar, content based on the context data, and transaction history. Further, interaction amongst conference participants can be monitored and utilized to update the background in one instance based on topics of conversation. Interactive content presented in the virtual background permits interaction by participants with the background. Furthermore, content can also be overlaid on the participant and the background in one instance.

16 Claims, 10 Drawing Sheets

(56) References Cited

U.S. PATENT DOCUMENTS

| | | |
|---|---|---|
| 2011/0208822 A1 | 8/2011 | Rathod |
| 2013/0086483 A1 | 4/2013 | Vainer et al. |
| 2013/0144957 A1 | 6/2013 | Sherman et al. |
| 2013/0159926 A1 | 6/2013 | Vainer et al. |
| 2014/0067702 A1 | 3/2014 | Rathod |
| 2014/0104372 A1* | 4/2014 | Calman ............... H04N 7/15 348/E7.084 |
| 2014/0121024 A1 | 5/2014 | Xing |
| 2014/0320591 A1* | 10/2014 | Baron, Jr. ............ H04N 7/15 348/14.08 |
| 2016/0182579 A1 | 6/2016 | Tsang |
| 2017/0132215 A1 | 5/2017 | Baughman et al. |
| 2018/0176508 A1* | 6/2018 | Pell ................. H04L 65/403 |
| 2020/0184217 A1* | 6/2020 | Faulkner ............... G06T 7/50 |
| 2020/0293261 A1 | 9/2020 | Janamanchi et al. |
| 2021/0042724 A1* | 2/2021 | Rathod ............. G07G 1/0054 |
| 2021/0299875 A1 | 9/2021 | Iyer et al. |
| 2021/0399911 A1 | 12/2021 | Jorasch et al. |
| 2022/0353474 A1* | 11/2022 | Springer ........... H04L 12/1818 |
| 2023/0117301 A1* | 4/2023 | Olivieri ............ H04L 65/403 348/14.07 |
| 2023/0126108 A1* | 4/2023 | Roper ................. G06T 7/90 348/14.08 |

* cited by examiner

SMART VIDEO CONFERENCE ENVIRONMENT

BACKGROUND

The popularity of video conferences and virtual meetings continues to ascend as more work is being done from home or elsewhere. Video conferences are meant to replace in-person face-to-face events with a remote version. However, homes or other locations outside a traditional office do not provide an ideal backdrop for projecting professionalism and trustworthiness. Common issues are a messy room or children and pets entering the frame. As a result, some participants simply turn off their cameras. Other participants opt to keep their cameras on but use a virtual background to avoid issues.

A virtual background is a simulated background that appears behind a participant in a video. The participant can select substantially any image to replace the actual background. For instance, a participant can select an image of a modern office, a beach, or a landmark such as the Golden Gate Bridge, which replaces the actual background in real-time during a video conference call. Consequently, a participant can enjoy privacy during a virtual meeting as well as add some fun to everyday video conference calls.

SUMMARY

The following presents a simplified summary to provide a basic understanding of some aspects of the disclosed subject matter. This summary is not an extensive overview. It is not intended to identify key/critical elements or delineate the scope of the claimed subject matter. Its sole purpose is to present some concepts in a simplified form as a prelude to the more detailed description presented later.

Briefly described, the disclosed aspects relate to a smart video conference environment. Context data surrounding a conference call or meeting can be acquired from various sources, including a meeting invitation or calendar entry for a meeting. In one embodiment involving a conference between a customer and service agent of a financial institution, customer account and transaction data can also be acquired as context. A virtual background can be identified, determined, or generated based on the context data. Further, content can be determined from the context data and added to the virtual background, or a virtual foreground overlaid on top of a conference participant and virtual background. In one instance, content in a virtual environment can be interactive, allowing participants to engage with the content. Interaction between conference participants can be monitored and analyzed to determine further context data, which can drive updates of a virtual environment in near real-time. An interface can also be provided to allow participants to request changes to a virtual environment, including addition or removal of content or changes to lighting or music associated with a virtual environment.

According to one aspect, disclosed embodiments can include a smart video conference system can be provided that comprises a processor coupled to a memory that includes instructions that, when executed by the processor, cause the processor to determine account and transaction data of a customer of a financial institution, predict a product of the financial institution of interest to the customer that is offered by the financial institution based on the account data or transaction data, generate a virtual background for a video conference between a service agent and the customer based on the customer account or transaction data, in which the virtual background includes an interactive link to further information about the product, segment a live video of the service agent into a foreground comprising the service agent and a background excluding the service agent, and replace the background with the virtual background in the live video. The instructions can further cause the processor to determine from the customer account data that a credit account balance satisfies a predetermined threshold and update the virtual background to include financial education content. Further, the instructions can cause the processor to determine that a payment is due from the customer account data and update the virtual background to include a reminder that the payment is due. The instructions can further cause the processor to convert a conversation between the service agent and the customer from speech to text, identify one or more keywords from the text, determine content based on the one or more keywords, and update the virtual background to include the content. In addition, the instructions can cause the processor to determine context data regarding a video conference from calendar data associated with the video conference, determine content based on the context data, and update the virtual background to include the content. In one instance, at least a subset of the content can be overlaid on top of the foreground comprising the service agent. Furthermore, the instructions further cause the processor to save the virtual background for access after the live video ends.

According to another aspect, disclosed embodiments can include a smart video conference system can be provided that comprises a processor coupled to a memory that includes instructions that, when executed by the processor, cause the processor to acquire context data regarding a video conference from calendar data associated with the video conference, generate a virtual background based on the context data, segment a live video of a conference participant into a foreground, comprising the participant, and a background, behind the participant, and replace the background in the video with the virtual background in the video. In one instance, the context data comprises a topic for discussion extracted from a meeting description. The instructions can further cause the processor to classify the video conference as business or personal based on a meeting description and generate the virtual background based on a classification. In addition, the instructions can cause the processor to determine content based on the context data and generate the virtual background including the content. In one instance, the content on the virtual background can be interactive. In another instance, a least a subset of the content can be overlaid on top of the foreground and the virtual background. The instructions can also cause a processor to transform audio of participant conversation to text in real-time, identify one or more keywords in the text, and update the virtual background based on the one or more keywords. Further yet, the instructions can cause the processor to acquire transaction data for another conference participant and generate the virtual background based on the transaction data.

Per another aspect, disclosed embodiments can include a computer-implemented method comprising executing, on a processor, instructions that cause the processor to perform operations that provision a video conferencing environment. The operations comprise identifying a virtual background based on context data for a video conference from calendar data associated with the conference, segmenting a live video of an attendee into a foreground comprising an attendee and a background behind the attendee, and replacing the background with the virtual background in the live video. The operations can further comprise identifying content based on the context data and overlaying the content on the virtual background. Furthermore, the operations can comprise transforming audible conversation between conference attendees into text, identifying a topic from the text, identifying a second virtual background based on the topic, and replacing the virtual background with the second virtual background. The operations can further comprise transforming audible conversation between conference attendees into text, identifying a topic from the text, determining content related to the topic, and overlaying the content on the virtual background. Further yet, the operations can comprise identifying content based on the context data and overlaying the content over the attendee in the live video.

To the accomplishment of the foregoing and related ends, certain illustrative aspects of the claimed subject matter are described herein in connection with the following description and the annexed drawings. These aspects indicate various ways in which the subject matter can be practiced, all of which are intended to be within the scope of the disclosed subject matter. Other advantages and novel features may become apparent from the following detailed description when considered in conjunction with the drawings.

DETAILED DESCRIPTION

Virtual backgrounds are becoming commonplace for video conferencing and virtual meetings. Meeting participants typically select a single static image as a virtual background for most meetings. As a result, the image is often unrelated to a particular meeting. Moreover, the image can be inappropriate for a meeting or a distraction in some instances. In fact, the image can be antithetical to the professionalism and trustworthiness that virtual backgrounds can provide.

Details herein pertain to a smart video conference environment. A virtual background can be automatically identified, determined, or generated based on various factors. In one instance, a virtual background can be generated based on context data acquired from a calendar regarding a meeting, such as a description of the meeting, time, and list of participants. Additional content can be acquired and derived from the context data or other sources such as the location of a participant, local weather, news, and participant nickname and hobbies. A virtual background can be produced that takes this content into account. Further, a participant's financial account data and transaction history can also be a virtual background factor with the participant's consent. For example, purchases made for a meeting can be identified as well as other purchases at a predetermined time before the meeting. Furthermore, interaction between participants, including their conversation, can be monitored and analyzed in real-time to identify particular keywords, phrases, topics, and sentiments that can be used as a basis for dynamic update of a virtual background. Further, portions of the virtual background can be interactive. Still further yet, music, lighting, and participant overlays can also be influenced by the same or different factors as the virtual background.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Figure 1:
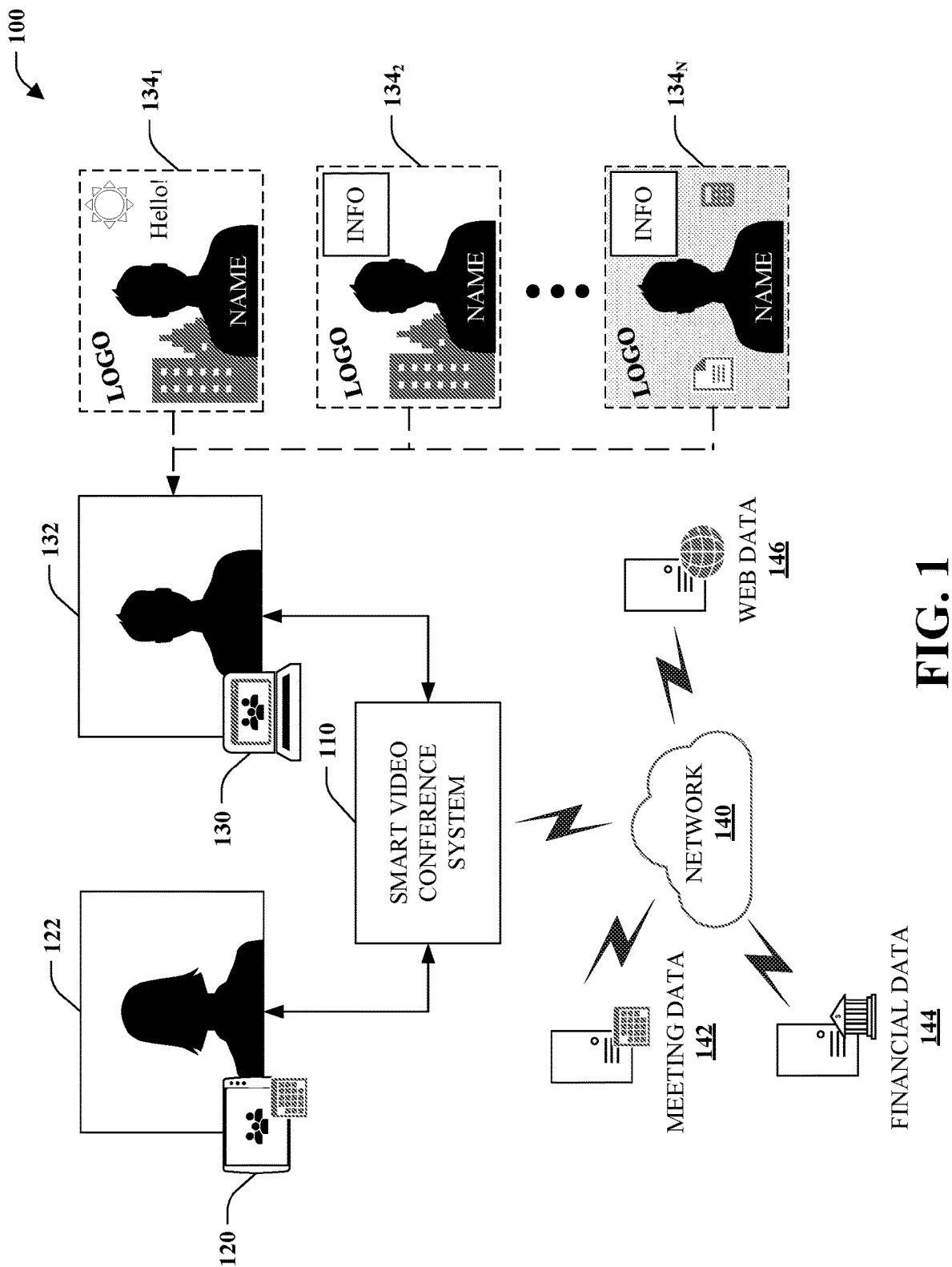
FIG. 1 illustrates an overview of an example implementation.

Referring initially to FIG. 1, a high-level overview of an example implementation 100 is depicted. The example implementation 100 includes smart video conference system 110, first computing device 120, second computing device 130, and network 140.

The smart video conference system 110 is operable to provide a pertinent, dynamic, and interactive video conference environment. In one instance, the smart video conference system 110 can be, or form part of, a communication platform (e.g., Zoom, Teams, WebEx, Meet). The smart video conference system 110 can be executed by the first computing device 120 and the second computing device 130. Alternatively, the smart video conference system 110 can operate on a network-accessible server.

The smart video conference system 110 can receive a first video 122 from a camera of the first computing device 120 and a second video 132 from a camera of the second computing device 130. Subsequently, the smart video conference system 110 can segment the foreground comprising the participant from the background in the video and replace the background with a virtual background for at least one of the first video 122 and the second video 132. The background can be automatically tailored to a meeting based on various data about the meeting or participants. For example, the system can request and receive data from an electronic calendar from the first computing device 120 or the second computing device 130. The data can correspond to meeting data or meeting context data, including a description of the meeting (e.g., title, topics for discussion), the meeting time, and a list of meeting participants or attendees, among other things.

The system 110 can acquire data from various sources over the network 140. The network 140 can correspond to a wide area network such as the internet. In one instance, the system 110 can acquire data from a calendar on a local client computing device. Alternatively, meeting data 142 can be acquired from a network-accessible location. The system 110 can also request and receive financial data 144 for a participant from a financial institution server if the participant permits access. The financial data 144 can include account and transaction data and be employed to identify purchases made for the meeting or within a predetermined time before the meeting. Further, the financial data 144 can aid in identifying and resolving issues by a service agent of the financial institution. Web data 146 can correspond to other data relevant to a meeting or participant. For example, web data can correspond to information related to a participant's location or information related to a particular topic.

In accordance with one aspect, the smart video conference system 110 can also monitor and transcribe an audible conversation between meeting participants in real-time. For example, a speech-to-text converter or technology can produce a text representation of the conversation. The text can then be analyzed for keywords, phrases, or topics. The virtual background can then be updated dynamically based on conversation content.

One or both of the first video 122 and the second video 132 can have an actual background replaced by a virtual background. Here, the example implementation 100 replaces solely the background of the second video 132. Further, the first video 122 can correspond to a customer of a financial institution, and the second video 132 can correspond to an employee of the financial institution, such as a customer service agent.

The smart video conference system 110 can identify a scheduled video call between a customer and a service agent of a financial institution from a calendar of the customer, service agent, or both. Meeting data can also be acquired from the calendar, such as a description or title of the meeting, time, and participants. Additional content can be determined from sensors or derived from other data sources, financial institution logo, location, and current weather. The system 110 can generate a series of virtual backgrounds or environments (1, 2, . . . n, where n is an integer greater than two) over time. As shown, the first virtual background or environment $134_1$ includes the financial institution logo on an image of the city where the service agent is located together with a sun representing the current weather and an initial greeting of "Hello." Further, the service agent's name or nickname is displayed over the bottom portion of the image of the service agent. Thus, a background layer is presented behind the service agent, and the name is overlaid in front of the service agent, producing a virtual environment in which the service agent is placed. The system 110 can acquire further data regarding the customer based on transaction data accessed with the customer's permission and analysis of the audible conversation between the customer and service agent, among other things. The result can be the addition of information about the customer being displayed over or in place of the sun and salutation as shown in background or environment $134_2$. For example, the information can include the customer's name, accounts, and balances. In one instance, a current account balance can be compared to a threshold associated with a high credit balance. If the balance satisfies the threshold, the background can be updated to include one or more potential intervention tools to nudge the user toward better financial habits, such as financial education, automatic saving, and credit building information. Further, the intervention tools can be interactive. As shown, the background $134_N$ includes a text document or link that can be opened and a calculator for quick calculations. In accordance with one embodiment, the virtual background or portions thereof, such as the overlaid content and links, can be saved for later reference or use after the video conference terminates.

Figure 2:
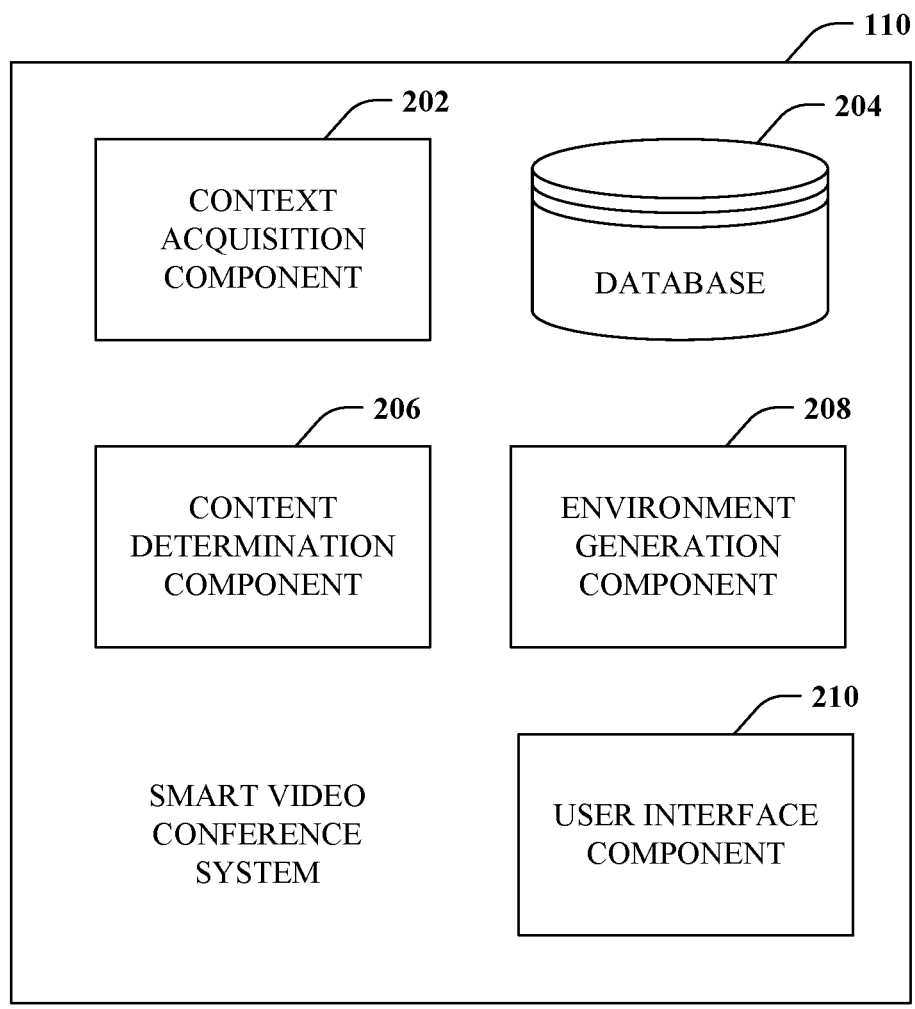
FIG. 2 is a block diagram of an example smart virtual environment system.

FIG. 2 is a block diagram depicting an example smart virtual conference system 110. The system 110 comprises context acquisition component 202, database 204, content determination component 206, environment generation component 208, and user interface component 210. The context acquisition component 202, content determination component 206, environment generation component 208, and user interface component 210 can be implemented by a processor coupled to a memory that stores instructions that cause the processor to perform the functionality of each component when executed. Consequently, a computing device can be configured to be a special-purpose device or appliance that implements the functionality of the smart video conference system 110. The smart video conference system 110 can be implemented by a communication platform that includes video conferencing (e.g., Zoom, Teams, WebEx).

The context acquisition component 202 is operable to receive, retrieve, or otherwise obtain or acquire contextual data concerning a conference and participants. Contextual or context data comprises background information that facilitates understanding of a meeting or conference and its participants. For example, context data can include a meeting topic, date, time, and list of participants. The context acquisition component 202 can acquire and save context data in database 204 for subsequent use and processing. The database 204 is a local or network-accessible system for saving, managing, and retrieving a collection of context data, among other things. Further, the context acquisition component 202 can operate in real or near real-time to monitor and analyze speech and participant body language.

Figure 3:
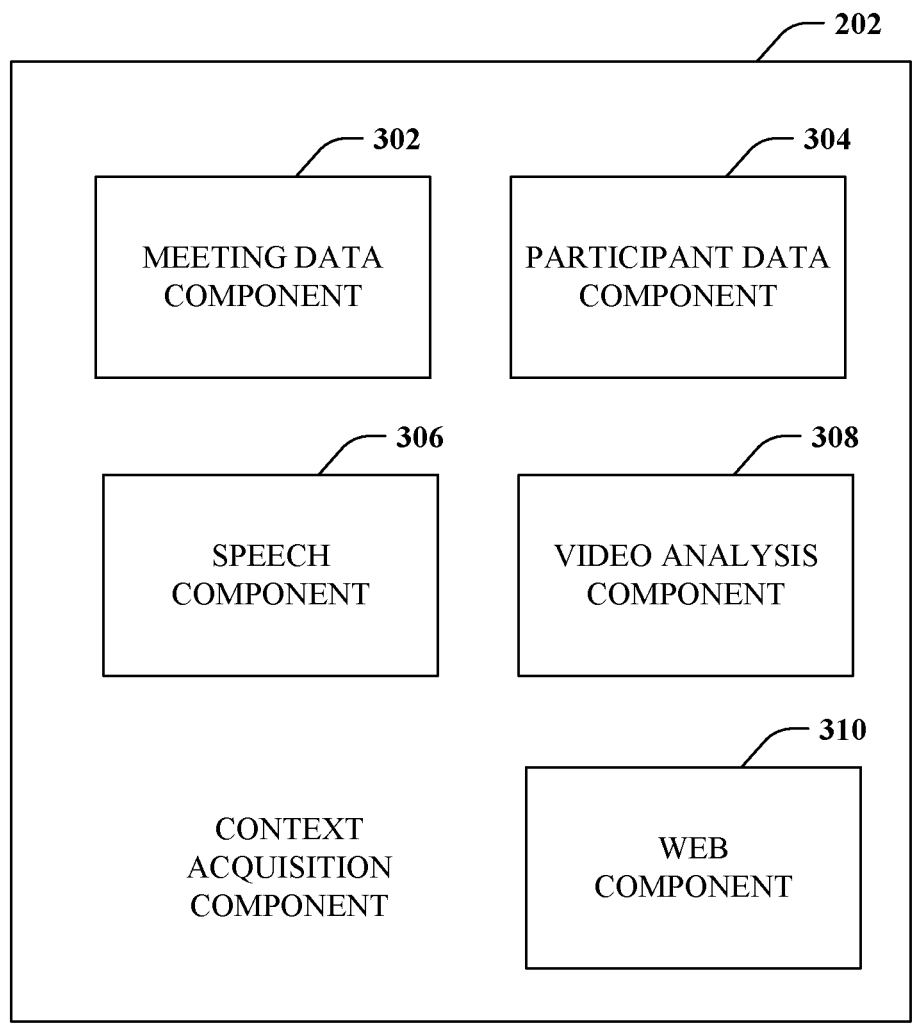
FIG. 3 is a block diagram of an example context acquisition component.

FIG. 3 depicts an example context acquisition component 202 to facilitate clarity and understanding. The context acquisition component 202 includes a plurality of subcomponents, including meeting data component 302, participant data component 304, speech component 306, video analysis component 308, and web component 310. These subcomponents can be implemented by a processor coupled to a memory that stores instructions that cause the processor to perform the functionality of each component when executed.

The meeting data component 302 is operable to receive, retrieve, or otherwise obtain or acquire information regarding a meeting. The meeting data can include the date and time of the meeting, participants, meeting topic, and type of meeting, among other things. In accordance with one aspect, the meeting data component 302 can analyze an electronic meeting invitation or calendar entry associated with scheduling the meeting. The meeting date, time, and participants can be extracted from the invitation or calendar entry. The meeting topic can involve further processing of the meeting title and any other included information such as descriptive text or attached documents. Natural language processing and other machine learning technologies can be employed to determine the meeting topic based on the presence of one or more keywords or phrases.

Determining the type of meeting can also involve additional processing. For example, natural language processing and other machine learning technologies can be employed to classify a meeting based on keywords or phrases. For example, named-entity recognition can, as part of information extraction, seek to locate and classify entities in text into pre-defined categories, such as person, organization, location, time, and quantities. The meeting can be classified or categorized as a business, educational, or personal meeting, among others. Further, participants and associated email addresses can aid such classification. For example, domain names of participant emails can indicate whether a meeting is personal (e.g., gmail.com), business (e.g., acmeco.com), or educational (e.g., *.edu).

The participant data component 304 is operable to receive, retrieve, or otherwise obtain or acquire context data regarding a participant. Participant data can include name, nickname, title, employer, and location among other demographic data. This data could be extracted from a profile associated with video conferencing or email vcard as well as social media, webpages, and network address, among other things. Furthermore, financial information, including accounts and transaction history, can be acquired if the participant agrees. The financial information can be utilized to identify any supplies or services that may have been purchased for a meeting or associated project, as well as purchase history and, thus, potential interests before the meeting. Further, the financial information can be helpful for meetings between customers and service agents of a financial institution in one embodiment.

The speech component 306 is operable to acquire further context data based on conversation analysis during a meeting. The speech component 306 can monitor audible conversation between meeting participants and employ a speech-to-text converter to convert the conversation to text. Natural language processing can be performed on the text to extract further information or context data associated with the meeting or meeting participants. This context data can supplement, augment, or replace other acquired context data. In one instance, the meeting topic can be refined based on an analysis of the conversation. Further, additional information can be acquired, such as the birthday or other significant event associated with a participant.

The video analysis component 308 is operable to acquire further context data regarding a participant based on a participant video. In one instance, the video analysis component 308 can analyze aspects of a background such as a logo, trophy, diploma, certificate, or other object or element. For example, a diploma from a particular university can indicate that the participant attended the university or is a fan. Similarly, a participant's apparel may be used to infer further context regarding a participant. For example, a participant can be wearing a shirt with a logo, indicating that the participant is associated with the group or entity with that logo. Further, the video analysis component 308 can monitor and analyze body language in conjunction with the conversation as determined by the speech analysis component. The analysis can seek to determine sentiment (e.g., positive, negative, neutral) as well as emotion (e.g., surprise, anger, disgust, happy, sad).

The web component 310 is operable to receive, retrieve, or otherwise obtain additional context data from websites or other sources. The world wide web can be searched for information associated with a meeting topic or participant. In one instance, if a news article or academic paper is referenced, the article or paper or a link thereto can be acquired. Further, the web component 306 can locate current news associated with a topic or meeting location, for example, to facilitate conversation.

Returning to FIG. 2, the content determination component 206 is operable to analyze the context data and determine content presented by the smart video conference system 110. The content determination component 206 can retrieve context data from the database 204 and determine whether or not the information should be presented as part of a virtual background, for example. Further, the content determination component 206 can determine or infer additional context data based on current context data. Furthermore, the content determination component 206 can respond to additional context data determined from analysis of the meeting conversation. In one instance, the content can identify one or more relevant images for inclusion in a background. In another instance, content can be selected for particular portions of an environment, such as a scrolling ticker at the bottom or a window next to a participant.

The environment generation component 208 is operable to generate a participant's virtual environment. In one instance, that environment can include a virtual background. The background can be of a particular color, include one or more graphics and text, as well as interactive mechanisms. The environment generation component 208 can seek to compose a hybrid environment with various aspects, including audio and visual features. The features can be acquired from the database 204 and identified by the content determination component 206.

Figure 4:
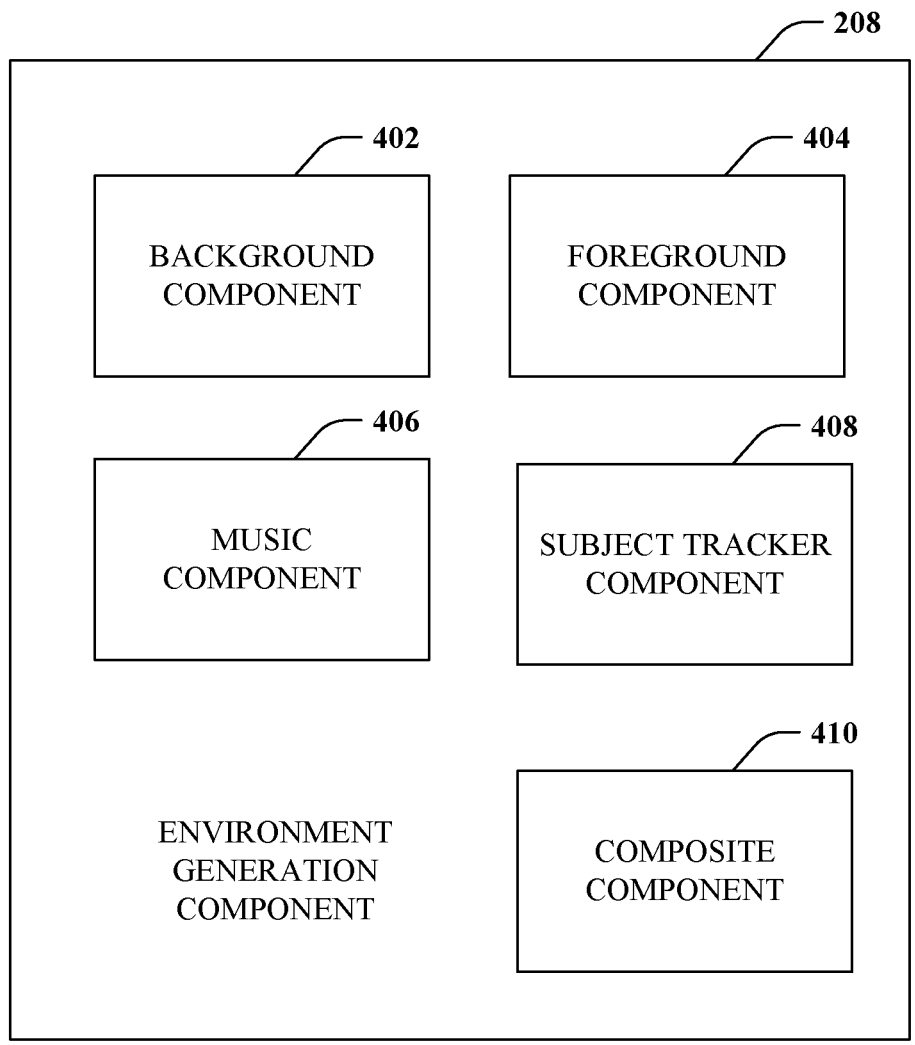
FIG. 4 is a block diagram of an example image generation component.

Turning briefly to FIG. 4, an example environment generation component 208 is depicted in further detail. The environment generation component 208 comprises background component 402, foreground component 404, music component 406, subject tracker component 408, and composite component 410.

The background component 402 is operable to generate a virtual background. The virtual background comprises an area behind a participant image. The virtual background can include one or more images, graphics, and text. In one embodiment, the background can include a video. Furthermore, the virtual background can include interactive objects such as a form, webpage link, calculator, or other application.

The foreground component 404 is operable to generate a virtual foreground presented over a participant image. In one instance, the name or nickname of a participant can be located in the foreground and displayed at least partially over the participant. Further, a content scroll bar can be generated by the foreground component 404 to present content in a scrolling fashion on the bottom of an image or frame. Furthermore, the foreground component 404 can generate a foreground that includes apparel presented over a participant. The foreground component 404 is also configured to apply one or more filters to change the lighting to match a desired or actual mood, among other things.

The music component 406 is operable to select and trigger music playing within the environment. The musical selection can be informed by context data and a desired mood or sentiment. In one instance, the music can be played at the beginning of the meeting as participants join and other participants wait for all participants to join. In one specific instance, the music can be played when conference participants are waiting until the conference leader joins and allows participants to move from a waiting room to the actual conference.

The subject tracker component 408 is operable to detect a person in an image or frame and segment the person from the background. Machine-learning-based neural networks can be utilized to perform segmentation by classifying each pixel as either belonging to the person or the background. Once the pixels are classified, the frame can be segmented or separated into a background and a foreground comprising a person. The subject tracker component 408 can perform this analysis expeditiously across a plurality of video frames.

The composite component 410 can combine multiple aspects to produce a virtual meeting environment. More particularly, a frame of a person can be overlaid on a virtual background frame, and a virtual foreground frame can be overlaid on the frame of the person and the virtual background frame. Further, music can be added and played in concert with a video comprising multiple frames.

Figure 5:
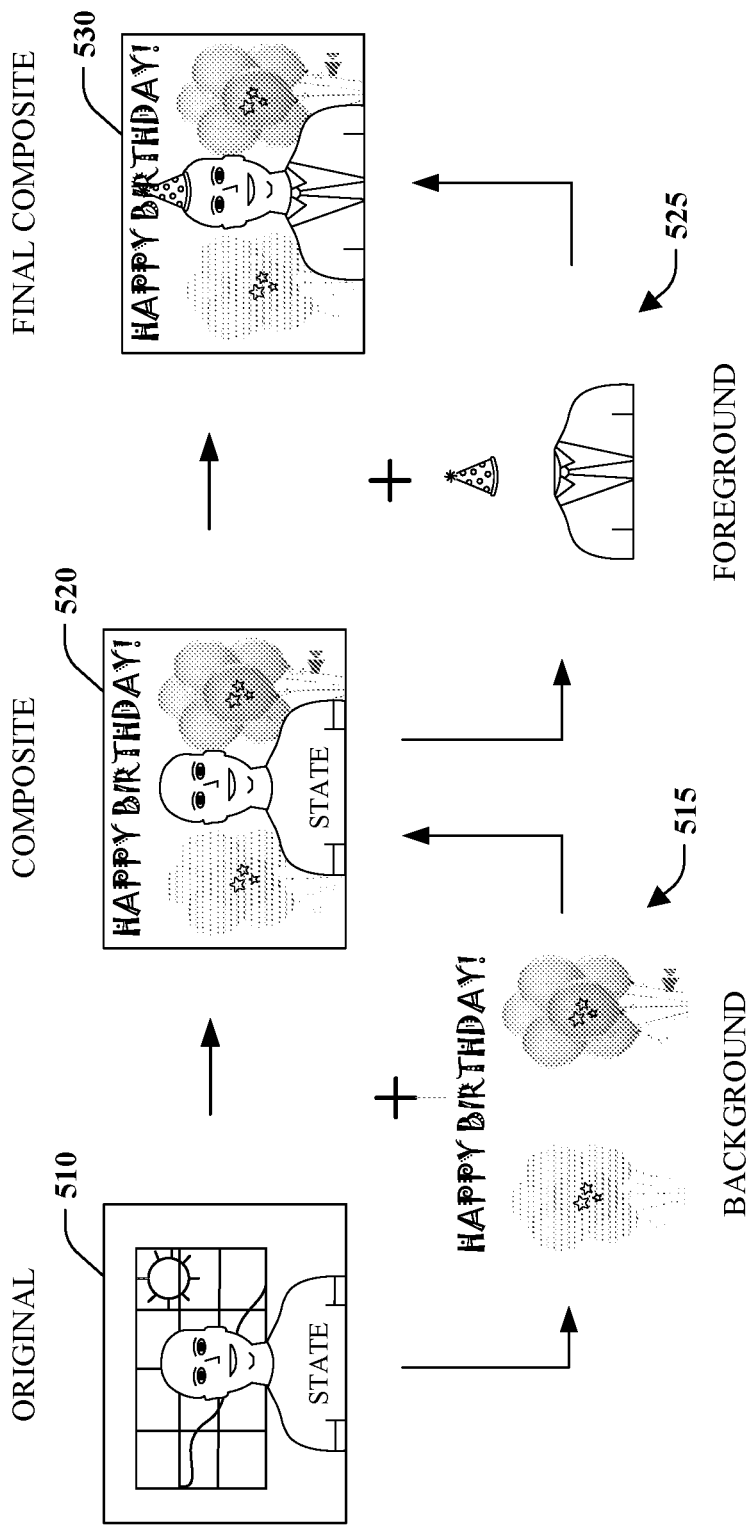
FIG. 5 depicts video conference call compositing.

Turning to FIG. 5, an example of compositing is illustrated to aid clarity and understanding with respect to at least the composite component 410. The example is captured in terms of a single image or frame of a video for one participant in a meeting. Further, the example concerns a scenario in which there is a business meeting, and it has been determined that it is the birthday of another participant in the meeting. The original frame 510 is captured by a camera of a participant's computing device. The original frame 510 captures the participant wearing a college t-shirt in a room in front of a window. In view of the birthday, a birthday virtual background 515 is generated or otherwise identified. Here, the virtual background includes the text "Happy Birthday!" together with two sets of balloons on a white backdrop. Further, the virtual background 515 includes a speaker icon that automatically, or when triggered, plays birthday or other music. The participant can be segmented from the original frame 510, and the composite frame 520 can be produced by overlaying the participant's image on top of the birthday virtual background 515. Being a business meeting with a birthday, a virtual foreground 525 is generated or otherwise determined or identified, including a suit and a traditional birthday hat. The virtual foreground 525 can be combined with the composite frame 520, comprising the virtual background 515 with an image of the participant, by overlaying the virtual foreground 525 on the composite frame 520 to produce the final composite frame 530. In one instance, other participants in the meeting can be informed of the birthday and provided the option to use the same virtual background 515.

Returning to FIG. 2, the user interface component 210 is operable to receive and respond to requests from a user. The user interface component 210 enables virtual assistance within the environment. In this manner, a participant can ask for the environment to include a document or change somehow. The user interface component 210 can correspond to or form part of a digital voice assistant that can employ speech-to-text to transform an audible request to text. Natural language processing, including text-to-intent, can be employed to determine what is meant by the user. Subsequently, intent-to-action can be employed to trigger an action that corresponds to the intent or satisfies the request. For example, a participant can request a change in background color, adding or removing lighting to an environment, or addition of a document, form, or link to the background, among other things.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component to provide aggregate functionality. Communication between systems, components and/or sub-components can be accomplished following either a push and/or pull control model. The components can also interact with one or more other components not specifically described herein for the sake of brevity but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers). Such components, among others, can automate certain mechanisms or processes performed, thereby making portions of the systems and methods more adaptive as well as efficient and intelligent. Many aspects of the smart video conference system 110 can employ such mechanisms to automatically segment and composite frames, understand meeting conversation, infer context data, make recommendations regarding content, and understand and respond to audible user requests, among other things.

In view of the example systems described above, methods that can be implemented in accordance with the disclosed subject matter will be better appreciated with reference to flow chart diagrams of FIGS. 6-9. While for purposes of simplicity of explanation, the methods are shown and described as a series of blocks, it is to be understood and appreciated that the disclosed subject matter is not limited by order of the blocks, as some blocks can occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 6:
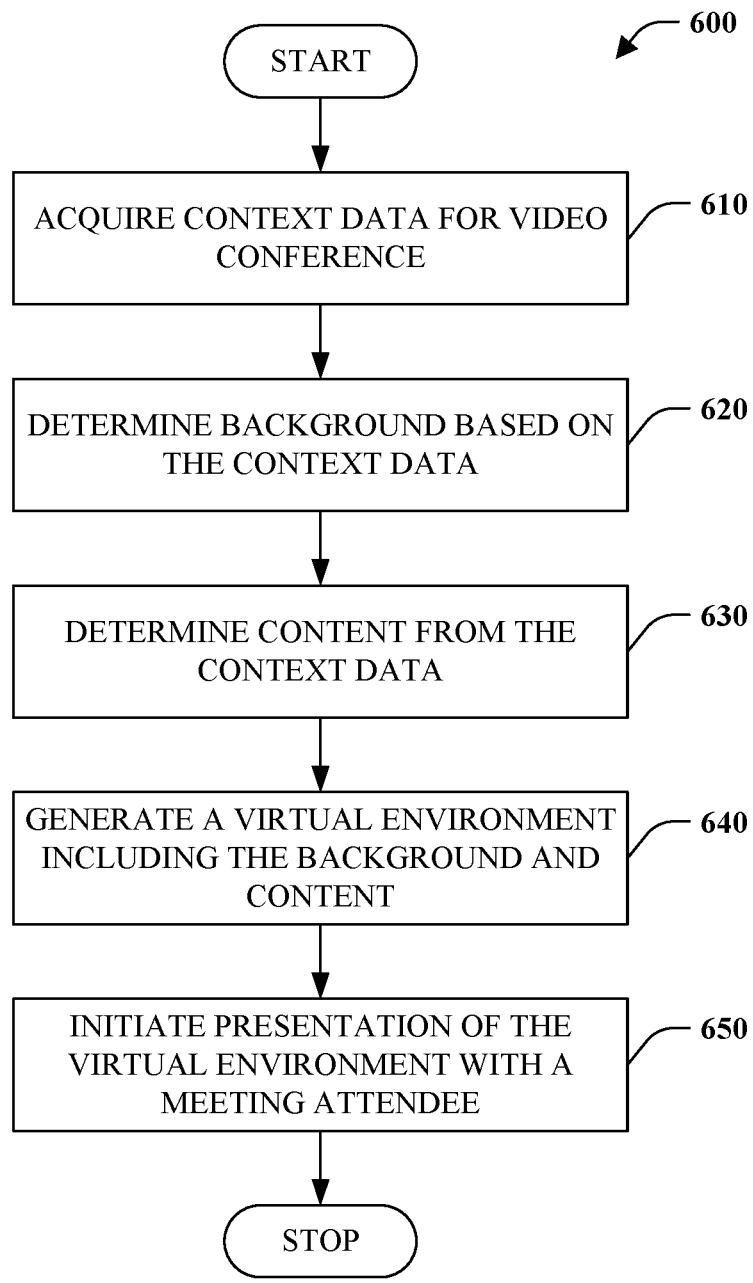
FIG. 6 is a flow chart diagram of virtual environment generation.

Turning attention to FIG. 6, a virtual environment generation method 600 is illustrated. The method 600 can be implemented and executed by the smart video conference system 110 and components thereof.

At reference numeral 610, context data is received, retrieved, or otherwise obtained or acquired in response to the initiation of a video conference call. The context data can be acquired by analyzing a video conference invitation or calendar entry. For example, the time and date can be acquired from the invitation or calendar entry. Further, natural language processing can determine meeting topics or the like from a subject line or other text within the invitation or calendar entry. Additional information can be acquired about a participant from a video conferencing system profile or the like. Context can be acquired and saved in advance of a conference call in one embodiment. In this instance, the context data can be acquired from a database or other data store.

At reference numeral 620, a virtual background is determined based on the context. The virtual background can be selected from several predetermined backgrounds in a data store. Alternatively, determination of the virtual background can comprise generating a background. The context data can influence selection or generation of a background. For example, if the conference call is associated with a business, a virtual background can be selected or generated that includes colors of the business, business logo, or both. Further, a city view or landmark associated with the location of a participant can form part of the background. As another example, if the conference call is personal, the background can be less formal and include a favorite color, quote, animal, or the like of the conference participant.

At reference numeral 630, content can be determined from the context data. Content generally refers to text but can also include a picture, video, document, or anything else viewable in a background. The context can include the participant's name, nickname, company, position, or hobbies, among other things. Further, the content can correspond to information about another participant. For example, the content can correspond to account details and transactions where one participant is a customer of another participant.

At reference numeral 640, a virtual environment is generated that includes the virtual background and content. The virtual environment can comprise a composite of several layers. For instance, the virtual environment can comprise the content overlaid on the virtual background producing a composite virtual background. For example, a window on a background can be filled with text content or a link or document placed on the background.

At numeral 650, presentation of the virtual environment with a meeting attendee or participant is initiated. A video of a meeting participant can be segmented from its actual background. Subsequently, the virtual environment comprising a virtual background and content can replace the actual background. In other words, the video or image frames of a meeting participant are overlaid on the virtual environment. For example, the machine learning model can infer a probability that a pixel belongs to a human participant or not. If the probability satisfies a threshold probability, the pixel can be classified as a human participant rather than a background.

Figure 7:
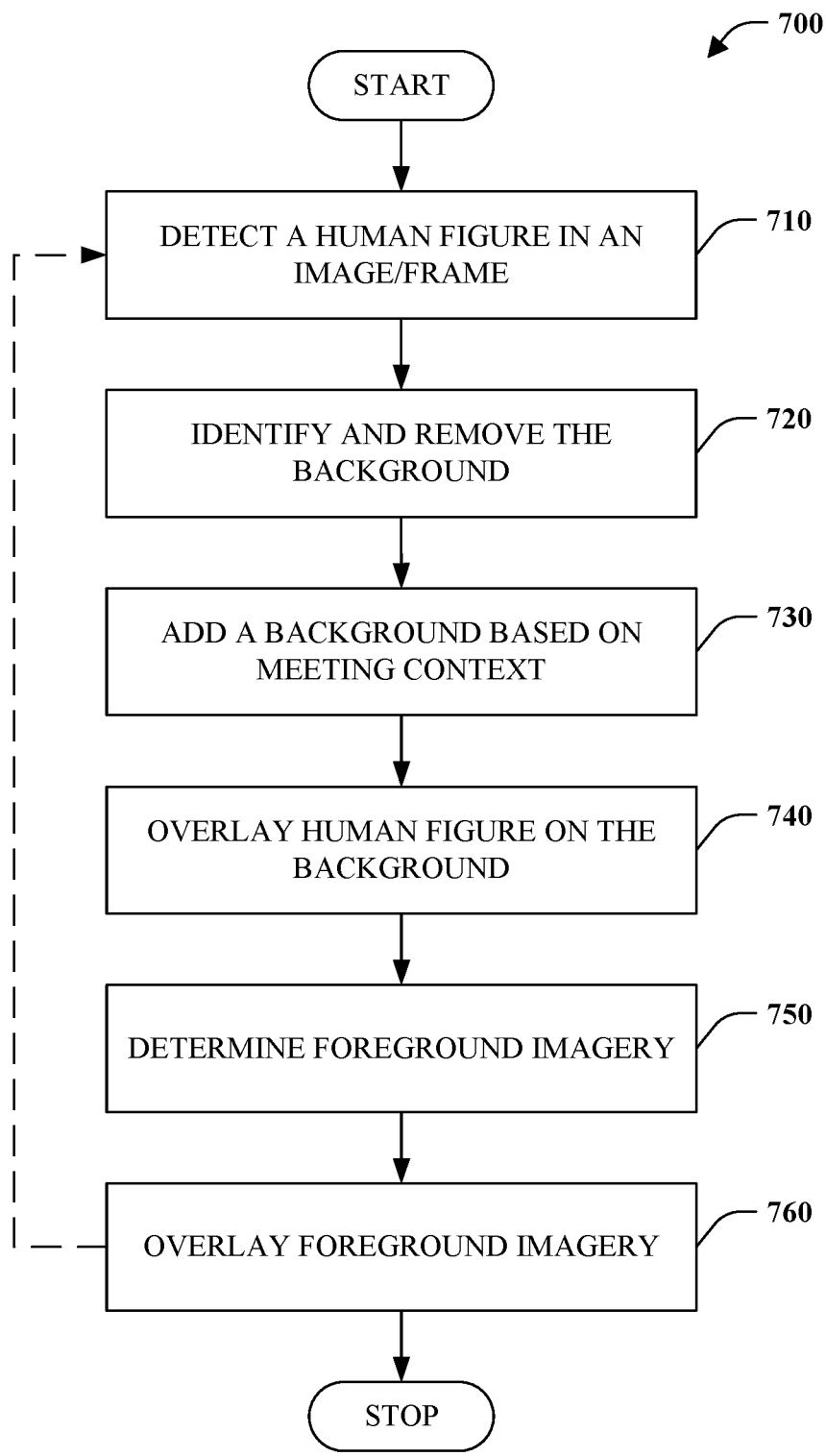
FIG. 7 is a flow chart diagram of virtual environment generation.

FIG. 7 is a flow chart diagram of a method 700 of generation and presentation of a virtual environment including a meeting participant. The method 700 can be implemented and executed by the smart video conference system 110.

At reference numeral 710, a human figure is detected in an image or video frame. Detecting a human figure can be performed by machine learning, for example, utilizing a neural network. More specifically, a machine learning model can analyze pixels in video frames and classify the pixel as belonging to a human figure or the background.

At reference 720, the background is identified and removed. After the human figure is identified, other pixels in a video frame can correspond to the background. These pixels can be removed or discarded. In other words, a video frame is segmented into a human figure and a background, and the background can be discarded, marked for replacement, or the like.

At reference numeral 730, a background is determined based on context data. Context data captures information surrounding a video conference meeting and its participants, among other things, such as but not limited to current events or happenings. Based on the context data, a background can be selected from several available backgrounds. If the video conference call pertains to business and the participant is employed by the business, a business background including a company logo and colors can be selected. Alternatively, a background can be generated based on the context data. In the same example above, the business background can be constructed based on knowledge of the business's color scheme and logo.

At numeral 740, the human figure is overlaid on the determined background. The human figure corresponds to a portion of an image or video frame corresponding to a participant segmented from the original or actual background. The determined background is thus a virtual background that takes the place of the original or actual background captured by a participant's camera.

At reference numeral 750, foreground imagery is identified based on context data. Foreground imagery pertains to a visual element (e.g., text, image, video) placed in the foreground over the human figure and background. In one instance, text content can be identified as the foreground imagery. For example, a participant's name, nickname, and position can be identified. In another instance, the foreground imagery can be apparel, such as a shirt, tie, jacket, or hat.

At numeral 760, the foreground imagery is overlaid on the human figure and virtual background. For example, a participant's name and position can be displayed at the bottom of the screen and over an image of the participant. In another instance, a news ticker can scroll across the bottom of the screen that includes relevant content or news. Still further yet, content can be displayed in free spaces such as over and adjacent to a participant's shoulder in a window similar to a newscast report.

Figure 8:
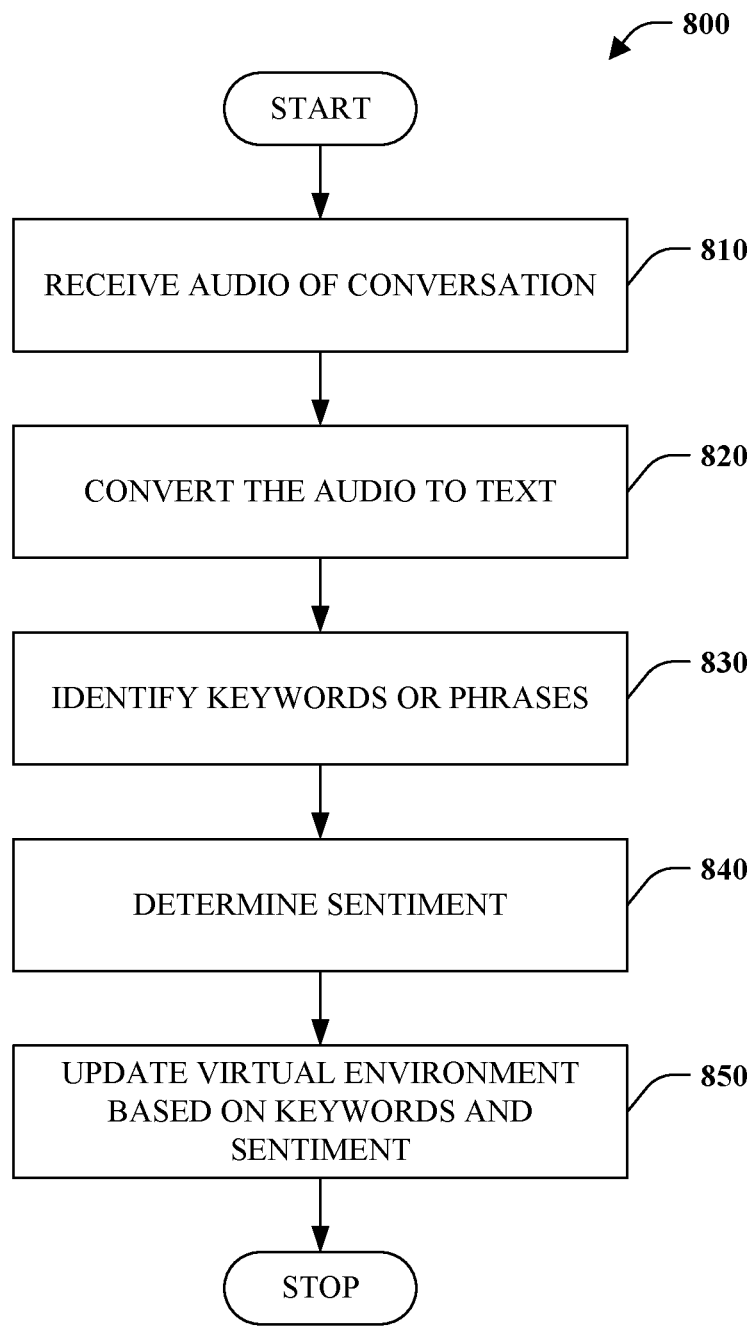
FIG. 8 is a flow chart diagram of updating a virtual environment.

FIG. 8 illustrates a method 800 of real-time update of a virtual environment. The method 800 can be implemented and performed by the smart video conference system 110 and components thereof, including the context acquisition component 202, content determination component 206, and environment generation component 208.

At reference numeral 810, audio of a conversation between meeting participants is received, retrieved, or otherwise obtained or acquired. Conversation between meeting participants can be monitored in real-time or near real-time.

The audio can subsequently be analyzed utilizing natural language processing technology. More specifically, at numeral 820, the audio is transformed from audio to text. For instance, a speech-to-text converter or related technology can be employed to convert the audio conversation into text.

At numeral 830, one or more keywords, phrases, or topics are identified from the text. For example, topic analysis with a topic model can be performed to automatically extract meaning from text based on identification of one or more topics. In one embodiment, text summarization can be performed over at least a portion of the conversation before enabling topic analysis to be performed over a subset of conversational data.

At reference numeral 840, sentiment can be determined regarding an identified topic. Sentiment analysis can be performed to determine how a participant feels about a topic automatically. An opinion or attitude toward a topic can be deemed an expression classified as positive, negative, or neutral.

At reference numeral 850, a virtual environment is updated based on the identified topic and optionally the sentiment of one or more participants regarding the topic. Information can be somewhat limited regarding a video conference call and initial generation of a virtual environment. During the meeting, analysis of the conversation to determine one or more keywords or topics can be utilized to refine the virtual environment. Consider a business video conferencing call as an example. The call can pertain to a particular aspect of a business, such as a division, group, or product, which may not be clear from initial context data. However, analysis of the conversation can reveal details that can be utilized to update a virtual environment. For instance, a virtual background can be changed to reflect a current topic, such as a business unit or division. It could also be learned that it is a participant's birthday, and the virtual environment can be transformed at least temporarily to be less formal and more celebratory with balloons, a cake, or banners. Sentiment can also be utilized to update a virtual environment, for instance, to reflect a positive, negative, or neutral attitude toward a topic. For example, a virtual background color could be changed to indicate support or opposition to a proposal. Further, a video of a participant can be analyzed for body language that indicates an emotion (e.g., surprise, anger, disgust, happy, sad) associated with a portion of the conversation, which can also be utilized as context data to influence how a virtual environment is updated.

Figure 9:
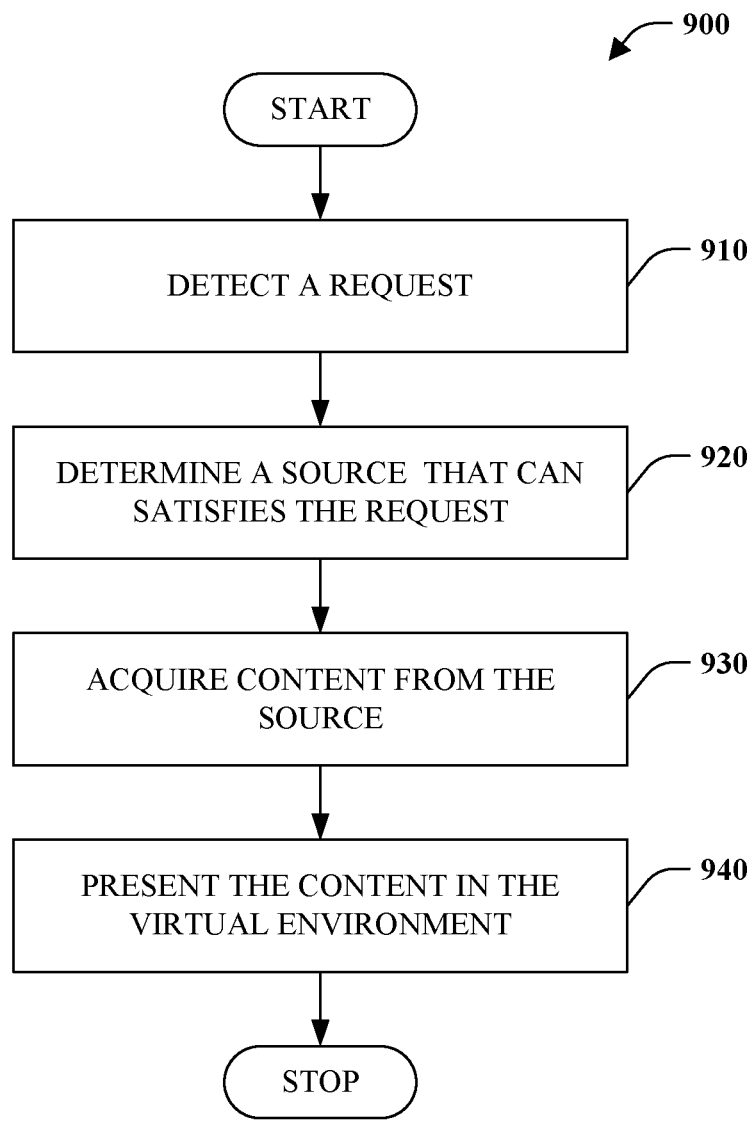
FIG. 9 is a flow chart diagram of provisioning assistance within a virtual environment.

FIG. 9 is a flow chart diagram of an assistance method 900 associated with a virtual environment. The method 900 can be implemented and executed by the smart video conference system 110 and associated components, such as the user interface component 210.

At reference 910, a request is detected or otherwise received. In one instance, natural language processing can be employed to detect a request during a meeting. In one embodiment, a keyword or phrase can be linked to a request such that the search that follows is captured as a request. Alternatively, a control, such as a button, can be presented and activated within a virtual environment to indicate what follows corresponds to a request.

At numeral 920, the request is analyzed to determine what is being asked and what will satisfy the request. Natural language processing can be employed to automatically process and understand the request. After the request is determined, a source that can satisfy the request can be ascertained. For example, a stock feed could be identified if the request is for current financial data. The request could also pertain to the definition of a word such that an online dictionary could be identified as the source. Further, the request could also pertain to a calculation, and a local or online calculator could be the source that can satisfy the request. Similarly, the request could pertain to changes to the virtual environment itself, such that the smart virtual conferencing system could be the source.

At reference numeral 930, a response can be received, retrieved, or otherwise obtained or acquired from an identified source. For example, a source can be accessed to perform some action to return a response to the request. The response can be text, an image, audio, video, or a combination depending on the request.

At 940, the response can be presented in the virtual environment. The response can be overlaid on a background, image of a participant, or foreground of a video in a video conference. However, the response can be to change the lighting, background, or music associated with the virtual environment itself.

This disclosure pertains to virtual backgrounds associated with video conferencing or virtual meeting technology. Disclosed aspects aim to add a virtual environment surrounding a video of a meeting participant to optimize the use of display space. The virtual environment can include a virtual background as well as foreground and music. Furthermore, the virtual environment can be smart in that a virtual environment, including the virtual background and foreground, can be identified or generated based on context data regarding a meeting and meeting participants. Further yet, the content presented in the virtual environment can be interactive, and a user assistant can respond to requests from meeting participants.

As used herein, the terms "component" and "system," as well as various forms thereof (e.g., components, systems, sub-systems . . . ) are intended to refer to a computer-related entity, either hardware, a combination of hardware and software, software, or software in execution. For example, a component can be but is not limited to being a process running on a processor, a processor, an object, an instance, an executable, a thread of execution, a program, and/or a computer. By way of illustration, both an application running on a computer and the computer can be a component. One or more components can reside within a process and/or thread of execution, and a component can be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference can be employed to identify a context or an action or can be used to generate a probability distribution over states, for example. An inference can be probabilistic. For example, computation of a probability distribution over states of interest can be based on a consideration of data or events. Inference can also refer to techniques employed for composing higher-level events from a set of events or data. Such inference can result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
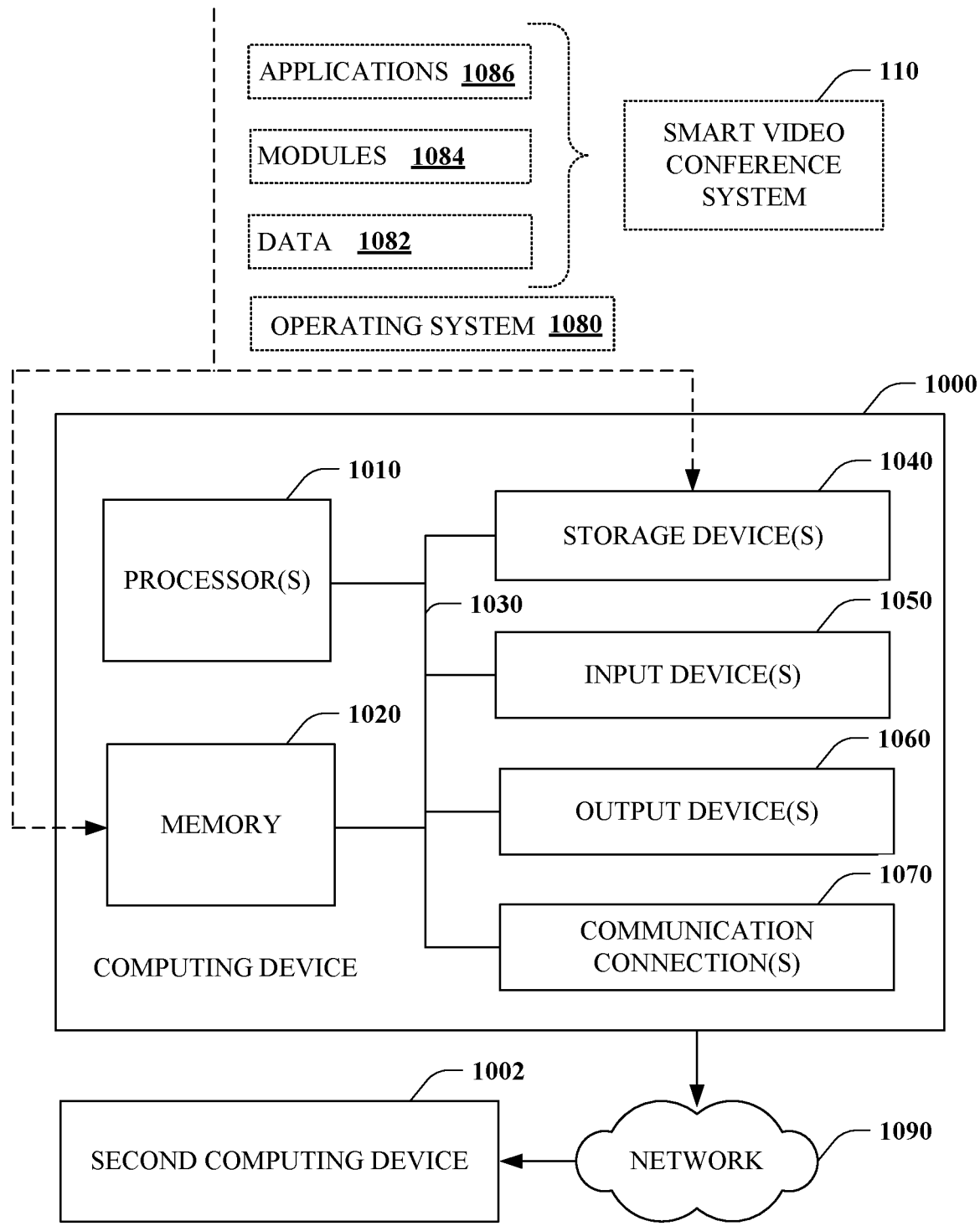
FIG. 10 is a block diagram illustrating a suitable operating environment for aspects of the subject disclosure.

To provide a context for the disclosed subject matter, FIG. 10, as well as the following discussion, are intended to provide a brief, general description of a suitable environment in which various aspects of the disclosed subject matter can be implemented. However, the suitable environment is solely an example and is not intended to suggest any limitation on scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, which perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on standalone computers. In a distributed computing environment, program modules can be located in one or both of local and remote memory devices.

FIG. 10 illustrates an example computing device 1000 (e.g., desktop, laptop, tablet, watch, server, hand-held, programmable consumer or industrial electronics, set-top box, game system, compute node). The computing device 1000 includes one or more processor(s) 1010, memory 1020, system bus 1030, storage device(s) 1040, input device(s) 1050, output device(s) 1060, and communications connection(s) 1070. The system bus 1030 communicatively couples at least the above system constituents. However, the computing device 1000, in its simplest form, can include one or more processors 1010 coupled to memory 1020, wherein the one or more processors 1010 execute various computer-executable actions, instructions, and or components stored in the memory 1020.

The processor(s) 1010 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. The processor(s) 1010 can also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 1010 can be a graphics processor unit (GPU) that performs calculations concerning digital image processing and computer graphics.

The computing device 1000 can include or otherwise interact with a variety of computer-readable media to facilitate control of the computing device to implement one or more aspects of the disclosed subject matter. The computer-readable media can be any available media accessible to the computing device 1000 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 1000. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 1020 and storage device(s) 1040 are examples of computer-readable storage media. Depending on the configuration and type of computing device, the memory 1020 can be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 1000, such as during start-up, can be stored in non-volatile memory, while volatile memory can act as external cache memory to facilitate processing by the processor(s) 1010, among other things.

The storage device(s) 1040 include removable/non-removable, volatile/non-volatile storage media for storage of vast amounts of data relative to the memory 1020. For example, storage device(s) 1040 include, but are not limited to, one or more devices such as a magnetic or optical disk drive, floppy disk drive, flash memory, solid-state drive, or memory stick.

Memory 1020 and storage device(s) 1040 can include, or have stored therein, operating system 1080, one or more applications 1086, one or more program modules 1084, and data 1082. The operating system 1080 acts to control and allocate resources of the computing device 1000. Applications 1086 include one or both of system and application software and can exploit management of resources by the operating system 1080 through program modules 1084 and data 1082 stored in the memory 1020 and/or storage device(s) 1040 to perform one or more actions. Accordingly, applications 1086 can turn a general-purpose computer 1000 into a specialized machine in accordance with the logic provided thereby.

All or portions of the disclosed subject matter can be implemented using standard programming and/or engineering techniques to produce software, firmware, hardware, or any combination thereof to control the computing device 1000 to realize the disclosed functionality. By way of example and not limitation, all, or portions of the smart video conference system 110 can be, or form part of, the application 1086, and include one or more modules 1084 and data 1082 stored in memory and/or storage device(s) 1040 whose functionality can be realized when executed by one or more processor(s) 1010.

In accordance with one particular embodiment, the processor(s) 1010 can correspond to a system on a chip (SOC) or like architecture including, or in other words integrating, both hardware and software on a single integrated circuit substrate. Here, the processor(s) 1010 can include one or more processors as well as memory at least similar to the processor(s) 1010 and memory 1020, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the smart video conference system 110 and/or functionality associated therewith can be embedded within hardware in a SOC architecture.

The input device(s) 1050 and output device(s) 1060 can be communicatively coupled to the computing device 1000. By way of example, the input device(s) 1050 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 1060, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1050 and output device(s) 1060 can be connected to the computing device 1000 by way of wired connection (e.g., bus), wireless connection (e.g., Wi-Fi, Bluetooth), or a combination thereof.

The computing device 1000 can also include communication connection(s) 1070 to enable communication with at least a second computing device 1002 utilizing a network 1090. The communication connection(s) 1070 can include wired or wireless communication mechanisms to support network communication. The network 1090 can correspond to a personal area network (PAN), local area network (LAN), or a wide area network (WAN) such as the interne. In one instance, the computing device 1000 can correspond to a meeting participant or attendee's desktop, laptop, tablet, or smartphone. The second computing device 1002 can be a desktop, laptop, tablet, or smartphone of another meeting participant or attendee. In another instance, the computing device 1000 can be a server associated with a video conference or virtual meeting platform that includes the smart video conference system 110, and the second computing device can be a desktop, laptop, tablet, or smartphone that accesses the functionality over the network 1090

What has been described above includes examples of aspects of the claimed subject matter. It is, of course, not possible to describe every conceivable combination of components or methods to describe the claimed subject matter. However, one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
one or more processors and memory that includes instructions that, when executed by the one or more processors, cause operations comprising:
acquiring calendar context data regarding a video conference based on calendar data associated with the video conference;
generating a transaction-data-derived virtual background comprising interactive product-related content, the interactive product-related content being based on (i) the calendar context data and (ii) a product predicted to be of interest to a conference participant and offered by a financial institution with which the conference participant is a customer, wherein, in connection with the video conference, the product is predicted to be of interest to the conference participant based on transaction data of the conference participant of the video conference; and
in connection with the video conference, modifying a live video of the conference participant of the video conference by replacing a background in the live video behind the conference participant with the transaction-data-derived virtual background comprising the interactive product-related content during the video conference such that the transaction-data-derived virtual background comprising the interactive product-related content is presented in the live video in lieu of the background of the live video.

2. The system of claim 1, the operations further comprising:
classifying the video conference as one of business or personal based on a meeting description; and
generating the transaction-data-derived virtual background based on the classification of the video conference.

3. The system of claim 1, the operations further comprising:
overlaying a subset of the interactive product-related content over the conference participant rendered in a foreground of the live video while at least another subset of the interactive product-related content is presented in the transaction-data-derived virtual background.

4. The system of claim 1, the operations further comprising:
transforming, during the video conference, audio of participant conversation to conversation text in real-time; and
updating, based on one or more words of the conversation text, the transaction-data-derived virtual background of the live video during the video conference.

5. The system of claim 1, the operations further comprising:
generating, based on second transaction data for another conference participant of the video conference, second interactive product-related content including an interactive product link that enables access to further information about a second product related to the second transaction data; and
updating, during the video conference, the transaction-data-derived virtual background to include the interactive product link that enables access to further information about the second product related to the second transaction data.

6. A computer-implemented method, comprising:
executing, on one or more processors, instructions that cause the one or more processors to perform operations comprising:
determining context data for a video conference based on calendar data associated with the video conference;
identifying a virtual background comprising interactive product-related content, the interactive product-related content being based on (i) the context data and (ii) a product predicted to be of interest to an attendee of the video conference and offered by a financial institution with which the attendee is a customer, the product being predicted to be of interest to the attendee based on transaction data of the attendee of the video conference; and
in connection with the video conference, modifying a live video of the attendee of the video conference by replacing a background of the live video with the virtual background comprising the interactive product-related content during the video conference such that the virtual background comprising the interactive product-related content is presented in the live video in lieu of the background of the live video.

7. The method of claim 6, wherein modifying the live video comprises overlaying the interactive product-related content on the virtual background during the video conference.

8. The method of claim 6, the operations further comprising:
   generating, based on second transaction data for another attendee of the video conference, second interactive product-related content including an interactive product link that enables access to further information about a second product related to the second transaction data; and
   updating, during the video conference, the virtual background to include the interactive product link that enables access to further information about the second product related to the second transaction data.

9. The method of claim 6, the operations further comprising:
   transforming, during the video conference, audible conversation between conference attendees into text; and
   updating, based on a topic derived from the text, the virtual background during the video conference.

10. The method of claim 6, the operations further comprising:
    overlaying at least a subset of the interactive product-related content over the attendee in the live video.

11. One or more non-transitory computer-readable media storing instructions that, when executed by one or more processors, cause operations comprising:
    determining context data for a video conference based on calendar data associated with the video conference;
    identifying a virtual background comprising interactive product-related content, the interactive product-related content being based on (i) the context data and (ii) a product predicted to be of interest to at least one attendee of the video conference and offered by a financial institution with which the at least one attendee is a customer, the product being predicted to be of interest to the at least one attendee based on transaction data of the at least one attendee of the video conference; and
    in connection with the video conference, modifying a live video of the at least one attendee of the video conference by replacing a background of the live video with the virtual background comprising the interactive product-related content during the video conference such that the virtual background comprising the interactive product-related content is presented in the live video in lieu of the background of the live video.

12. The one or more non-transitory computer-readable media of claim 11, wherein modifying the live video further comprises overlaying the interactive product-related content on the virtual background during the video conference.

13. The one or more non-transitory computer-readable media of claim 11, the operations further comprising:
    updating, based on the predicted product of interest, the virtual background during the video conference to include at least one interactive product link that enables access to access further information about the predicted product of interest of the at least one attendee.

14. The one or more non-transitory computer-readable media of claim 11, the operations further comprising:
    determining that a payment is due based on account data of the at least one attendee of the video conference; and
    updating, based on the payment being due, the virtual background to include a reminder indicating that the payment is due.

15. The one or more non-transitory computer-readable media of claim 11, the operations further comprising:
    determine that a credit account balance satisfies a predetermined threshold based on account data of the at least one attendee of the video conference; and
    updating, based on the credit account balance satisfying the predetermined threshold, the virtual background to include financial education content.

16. The one or more non-transitory computer-readable media of claim 11, the operations further comprising:
    transforming, during the video conference, audible conversation between conference attendees into text; and
    updating, based on a topic derived from the text, the virtual background during the video conference.

* * * * *